Jan. 16, 1968     A. C. MAGUIRE     3,363,860
AIRCRAFT
Filed May 4, 1966     2 Sheets-Sheet 1
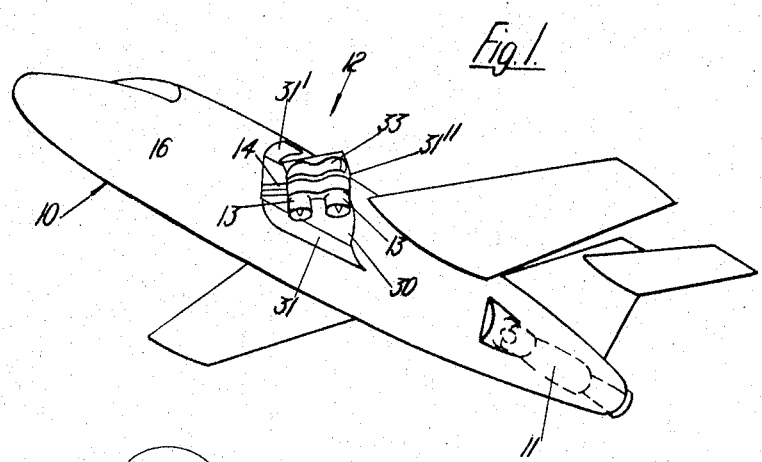
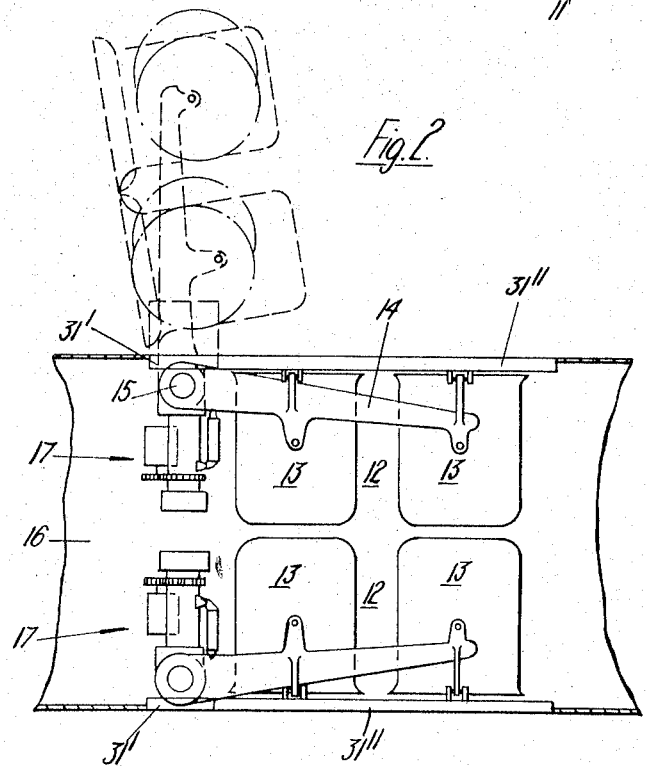

Jan. 16, 1968   A. C. MAGUIRE   3,363,860
AIRCRAFT
Filed May 4, 1966   2 Sheets-Sheet 2
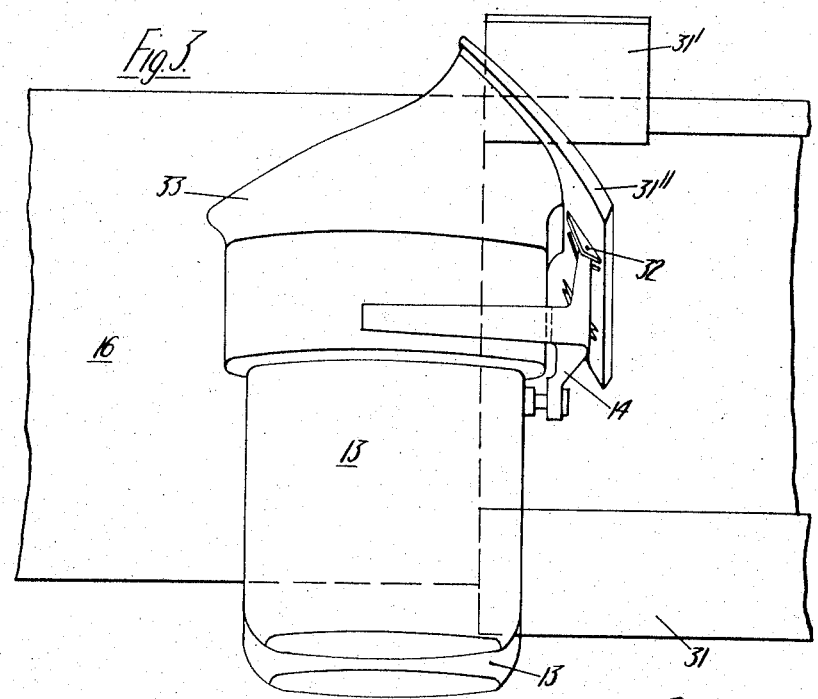
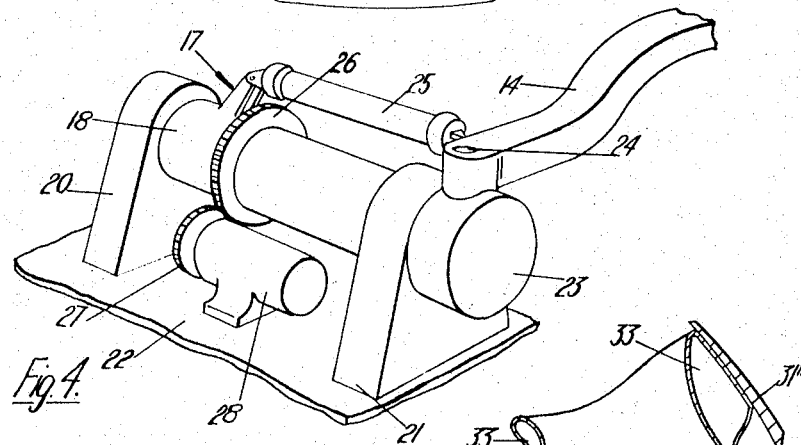
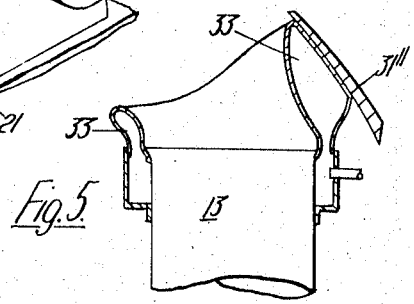

3,363,860
AIRCRAFT
Addison Charles Maguire, Derby, England, assignor to Rolls-Royce Limited, Derby, England, a British company
Filed May 4, 1966, Ser. No. 547,605
Claims priority, application Great Britain, May 14, 1965, 20,589/65
4 Claims. (Cl. 244—54)

ABSTRACT OF THE DISCLOSURE

An aircraft which has retractible lift propulsion units which, when stowed in the aircraft fuselage, are disposed with their axes horizontal. Each propulsion unit is provided with an inflatable air intake, and is movable through a port in the aircraft fuselage, the latter being provided with a flap which supports part of the inflatable intake.

---

This invention concerns aircraft and is an improvement in or modification of the invention disclosed and claimed in our co-pending application Ser. No. 414,536, filed Nov. 30, 1964, now Patent No. 3,302,907.

In our co-pending application Ser. No. 414,536 there is disclosed and claimed an aircraft having at least one forward propulsion engine provided with an additional propulsion unit which is mounted so as to be movable between a position in which it is disposed within the fuselage of the aircraft, and a further position in which it is disposed externally of the aircraft so as to be capable of producing lift forces on the aircraft independently of those produced by the aerodynamic surfaces of the aircraft during forward flight therof or forward propulsion, the arrangement being such that the thrust produced by the or each additional propulsion unit can be directed rearwardly of the aircraft to enable transition of the aircraft from vertical to forward flight to be effected.

According to the present invention there is provided an aircraft having at least one forward propulsion engine provided with an additional propulsion unit which is mounted so as to be movable between a position in which it is disposed within the fuselage of the aircraft, and a futrher position in which it is disposed externally of the aircraft so as to be capable of producing lift forces on the aircraft independently of those produced by the aerodynamic surfaces of the aircraft during forward flight thereof or forward propulsion, said additional propulsion unit being provided with an inflatable intake.

Preferably the additional propulsion unit is moved into and out of the fuselage through a port which is adapted to be covered by a flap, at least part of which is movable with said unit and forms a support for part of said inflatable intake.

The unit may be adapted to be stowed in said fuselage with its axis of symmetry substantially horizontal, means being provided for rotating said unit about a substantially horizontal axis which is substantially perpendicular to said axis of symmetry to incline the axis of symmetry to the horizontal and provide direct lift forces from the unit.

Thus part of the flap may be pivotally mounted on the unit such that it covers the intake thereto when the unit is stowed in the fuselage, means being provided for pivoting the part of the flap away from the intake to uncover the intake and provide support for the inflatable intake.

In a preferred embodiment there are at least two additional propulsion units disposed on either side of the longitudinal axis of the aircraft. Thus there may be two sets of additional propulsion units, each set comprising two propulsion units mounted on a common yoke for pivotal movement with respect to the fuselage and provided with a common inflatable intake.

Preferably the additional propulsion units are gas turbine jet propulsion engines.

The invention is illustrated, merely by way of example, in the accompanying drawings, in which:

FIGURE 1 is a general view of an aircraft in accordance with the present invention, FIGURE 2 is a plan view of part of the aircraft shown in FIGURE 1, FIGURE 3 is a side elevation of part of the aircraft shown in FIGURE 1, FIGURE 4 is a general view of part of the aircraft shown in FIGURE 1, and FIGURE 5 is a part sectional elevation of part of the aircraft shown in FIGURE 1.

Referring to the drawings, there is shown an aircraft 10 provided with a forward propulsion gas turbine axial flow engine 11 and with two sets of direct vertical lift gas turbine jet propulsion engines 12 ("direct vertical lift engines" are engines which provide lift independently of any forces produced by the flow of air over aerodynamic surfaces) only one set of which is shown in FIGURE 1. The sets 12 are disposed one on either side of the longitudinal axis of the aircraft and each set comprises two gas turbine direct lift jet propulsion engines. The engines 13 of each set are mounted on a common yoke 14 which is pivoted about pivot 15 for movement between the full line and broken line positions shown in FIGURE 2. In the full line position of FIGURE 2 the engines 13 are housed within the fuselage 16 of the aircraft and in the broken line position of FIGURE 2 the engines 13 are mounted externally of the fuselage in a line extending transversely of the longitudinal axis of the aircraft.

Machinery 17 for moving the sets 12 of engines 13 into and out of the fuselage 16 is shown in more detail in FIGURE 4. Referring to FIGURE 4 the machinery 17 comprises a shaft 18 mounted within pedestal bearings 20, 21 from fixed structure 22 fixed to the fuselage 16 of the aircraft. Mounted on one end 23 of the shaft 18 is a pivot 24 to which yoke 14 is pivotally mounted. Attached to yoke 14 at a point spaced from the axis of pivot 24 is one end of a ram 25, the other end of which is fixed to the shaft 18. Also mounted on shaft 18 is a gear wheel 26 which meshes with a gear wheel 27 mounted on the end of a drive shaft from an electric motor 28. Motor 28 can rotate in either direction under suitable control (not shown).

In the position of the machinery 17 shown in FIGURE 4, the engines 13 are in their stowed position shown in full lines in FIGURE 2. To move the engines 13 to the broken line position shown in FIGURE 2, the ram 25 is actuated thus urging yoke 14 to pivot about pivot 24 from the position shown in FIGURE 4 to a position in which the longitudinal axis of the yoke 14 has turned through 90° and is parallel with the longitudinal axis of the shaft 18. The engines 13 are then in the broken line positions shown in FIGURE 2.

It will be appreciated, from considering FIGURE 2, that the engines 13 are stowed in the fuselage 16 with their longitudinal axes at 90° to the longitudinal axis of the aircraft in a substantially horizontal position. In moving to the broken line position of FIGURE 2, the lift engines 13 will still be disposed in their substantially horizontal position although their longitudinal axes will be substantially parallel with the longitudinal axis of the aircraft. To provide direct vertical lift the engines must be rotated through substantially 90° such that their longitudinal axes are substantially vertical and this can be effected by actuation of motor 28.

Upon actuation of motor 28 the shaft 18 is rotated about its longitudinal axis, the yoke 14 rotating about the longitudinal axis of shaft 18 at the same time due to its connection through pivot 24 to the shaft. Thus the engines 13 are moved to the substantially vertical position shown, for example, in FIGURE 3 and in FIGURE 1.

The sets 12 of engines 13 are moved into and out of fuselage 16 through ports 30 cut in the wall of the fuselage. The ports 30 are covered by flap 31, 31', 31", one part 31" of the flap being fixed to the set of engines 12 for movement therewith whereas parts 31, 31' of the flap are pivotally attached to the fuselage 16. Part 31" of the flap is pivotally mounted to yoke 14 by pivots 32, means (not shown) being provided for pivoting the portion 31" between the position shown, for example, in FIGURE 2 in which this portion lies over and covers the intakes to the engines 13 and the position shown, for example, in FIGURES 3 and 5 in which the portion 31" is disposed at an angle to the intakes to the engines 13, being spaced therefrom.

Disposed around the intake to the engines 13 of each set 12 is a common inflatable intake 33 attached along one side thereof to the part 31". The inflatable intake 33 is common to both engines 13 of each set 12 and, due to its connection to part 31", the intake 33 will be partly extended when part 31" is moved to the position shown in FIGURES 3 and 5. Means (not shown) are provided for inflating the inflatable intake 33 from its collapsed position to the position shown in FIGURES 3 and 5. In the position of the inflatable intake shown in FIGURES 3 and 5 it will be appreciated that ram air will be deflected into the intake of the engines 13 thereby providing better operating characteristics for these engines and ensuring an adequate supply of air which may not otherwise be obtained.

In operation, when it is desired, for example, to use the engines 13 for a vertical or short landing, the engines are moved to the broken line position shown in FIGURE 2 in which the engines 13 are disposed with their longitudinal axes parallel with the longitudinal axis of fuselage 16. In this position, part 31' of the flap is extended to thereby uncover the intakes to engines 13 and the ram air received by engines 13 is used to start these engines. It will be appreciated that this ram air effect will be substantial due to forward motion of the aircraft. Once the engines 13 have started air is bled from these engines to inflate the inflatable intakes 33 and motor 28 is operated to turn the engines 13 to the substantially vertical position in which they provide the direct vertical lift forces for providing vertical landing. Alternatively, the engines may be rotated such as to be inclined to the horizontal in which case they provide lift forces for a short landing.

It will be appreciated that the inflatable intakes 33 may be wholly or partly extended while the engines 13 are stowed within the fuselage or the expansion of the inflatable intake may occur outside the fuselage 16. A single engine 13 may be used on each side of the aircraft in place of this set of two proposed and, of course, gas turbine jet propulsion lift engines need not be employed but fans such as those disclosed in our co-pending application Ser. No. 414,536.

Instead of obtaining the air for inflating the intakes 33 from the lift engines 13 themselves once the intake 33 has been partially opened by movement of the portion 31", the air may be obtained from the forward propulsion engine 11. It will be appreciated that it is preferable to obtain the air from the lift engines 13 themselves since they are closer to the intakes 33 and thus less ducting is needed to bleed the air than would be required from, for example, the forward propulsion engine 11.

The degree by which portion 31" is inclined to the longitudinal axis of the engines 13 is determined by the amount by which the engines 13 may be tilted to the vertical to provide reverse thrust for the aircraft. Even in the reverse thrust position in which the outlet from the engines 13 is disposed forwardly of the intake thereto, the inflatable intake 33 should be disposed substantially vertically such that it can still obtain some ram air for operation of the engines. It will be appreciated that, should the axis of symmetry of the intake 33 be inclined to the vertical and be sloping substantially rearwardly and not forwardly of the aircraft, little air will be drawn into the engine under ram effect and the engines 13 will be adversely effected. Even with the intake 33 disposed substantially vertically the operating conditions are not ideal since little ram air is received but the engine should never be tilted to such an extent that the intake 33 is moved past the vertical position.

I claim:

1. An aircraft having at least one forward propulsion engine and provided with an additional propulsion unit, movable mounting means for said additional propulsion unit for moving said unit between a stowed position in which it is disposed within the aircraft, and an operative position in which it is disposed externally of the aircraft, an inflatable intake for said additional propulsion unit, means for inflating said intake when the propulsion unit is in its said operative position, a port in the fuselage of the aircraft through which the additional propulsion unit is moved between its stowed and operative positions, a movable flap adapted to cover the port, at least part of said flap being movable with the unit and supporting part of said inflatable intake, the propulsion unit being so orientated in said operative position that it may produce direct lift forces on the aircraft.

2. An aircraft having at least one forward propulsion engine and provided with an additional propulsion unit, movable mounting means for said additional propulsion unit for moving said unit between a stowed position in which it is disposed within the fuselage of the aircraft with its axis of symmetry substantially horizontal, and an operative position in which it is disposed externally of the aircraft, said movable mounting means including means for rotating said unit about a substantially horizontal axis which is substantially perpendicular to said axis of symmetry to incline the axis of symmetry to the horizontal and provide direct lift forces from the unit when the latter is in said operative position, an inflatable intake for said additional propulsion unit and means for inflating said intake when the propulsion unit is in said operative position.

3. An aircraft as claimed in claim 1 including two sets of said additional propulsion units, each set comprising two propulsion units, and each set being disposed on either side of the longitudinal axis of the aircraft when the propulsion units are in their operative positions, a common pivotally mounted yoke for each set of propulsion units, and a common inflatable intake for the two propulsion units of each said set of propulsion units.

4. An aircraft as claimed in claim 1 wherein said part of the flap is pivotally mounted on the unit such that it covers the intake thereto when the unit is stowed in the fuselage, and means are provided for pivoting the part of the flap away from the intake to uncover the intake and provide support for the inflatable intake.

References Cited

UNITED STATES PATENTS 3,224,712    12/1965    Taylor et al. _____ 244—53
3,302,907    2/1967    Wilde et al. _____ 244—54

MILTON BUCHLER, *Primary Examiner.*

B. BELKIN, *Assistant Examiner.*